United States Patent [19]

Lazar et al.

[11] 4,229,178

[45] Oct. 21, 1980

[54] DYE COMPOSITIONS

[75] Inventors: Remus I. Lazar, Berwyn; Richard C. Reichel, Chicago, both of Ill.

[73] Assignee: Velsicol Chemical Corporation, Chicago, Ill.

[21] Appl. No.: 912,170

[22] Filed: Jun. 5, 1978

[51] Int. Cl.³ .................... D06P 1/651; D06P 3/84; D06P 1/16

[52] U.S. Cl. .................................. 8/583; 8/597

[58] Field of Search ............. 8/92, 173, 54, 21 B

[56] References Cited

U.S. PATENT DOCUMENTS

| | | | |
|---|---|---|---|
| 2,881,045 | 4/1959 | Mecco et al. | 8/173 |
| 3,203,753 | 8/1965 | Sherburne | 8/93 |
| 3,625,011 | 12/1975 | Boehmke | 8/173 |
| 3,700,405 | 10/1972 | Petite et al. | 8/173 |

*Primary Examiner*—Joseph L. Schofer
*Assistant Examiner*—Maria S. Tungol
*Attorney, Agent, or Firm*—Dietmar Olesch; Robert J. Schwarz

[57] ABSTRACT

This invention discloses compositions and methods for dyeing natural proteinaceous and synthetic polyamide fibers, particularly wool, silk and nylons, utilizing dye assistants effective both with acid and disperse dyes, such assistants being combinations of a mixture of lower esters of chlorinated benzoic acids with a mixture of lower alkyl esters of toluic and benzoic acids.

5 Claims, No Drawings

DYE COMPOSITIONS

BACKGROUND OF THE INVENTION

1. Field of the Invention

This invention relates to the dyeing of natural proteinaceous and synthetic polyamide fibers, particularly the normal and specialty nylons.

2. Description of the Prior Art

The dyeing of nylons—manufactured fibers in which the fiber-forming substance is any long chain synthetic polyamide having recurring amide groups as part of the chain—may, depending on the specific type of nylon involved—be accomplished with many different classes of dyes, e.g.: basic, acid disperse, direct, etc. The acid and disperse dyes are in wide commercial use and the dye compositions of this invention utilize these classes of dyes. For reasons of speeding of dyeing, maximum utilization of dye and improving evenness of color throughout the dyed fiber, these dyes are generally used in conjunction with "assistants" (sometimes designated as "carriers")—materials which promote the attainment of speedy dyeing, maximum dye utilization, etc. There are a number of assistants commercially available, but the experiments carried out in the work leading to this invention indicated that, generally, an assistant effective with an acid dye is not optimum for disperse dyes and vice versa. Use of only one assistant for both acid and disperse dyeing would be advantageous to a dyer in that inventories of different assistants could be reduced and there would be less possibility of erroneous selection of assistant.

This invention provides for dye assistants which are effective in both acid and disperse dyeing systems.

SUMMARY OF THE INVENTION

In accordance with this invention, there have been found dye assistants effective with both acid and disperse dyes, such assistants comprising combinations of a mixture of lower alkyl esters of di- and mono-chlorinated benzoic acids with a mixture of lower alkyl esters of toluic and benzoic acids.

DESCRIPTION OF THE PREFERRED EMBODIMENT

While any of the lower alkyl (where lower alkyl is an alkyl radical of from one to three carbon atoms) esters of mono- and di-chlorinated benzoic acid are usable, the preferred embodiment employs the methyl esters. Any of the isomers—ortho, meta or para—of mono-chlorinated benzoic acid are usable as are also any of the isomers of di-chlorinated benzoic acid. The amount of di-chlorinated esters in the mixture may vary from 80 to 95 weight percent with the mono-clorinated esters comprising the remainder. For convenience, the mixture of methyl chlorobenzoates will be hereinafter referred to as "MCB".

With the mixture of lower alkyl esters of benzoic and toluic acids: methyl, ethyl and propyl esters are usable as are also any of the isomeric toluic acids. A ratio of 75:25 weight/weight alkyl toluates: alkyl benzoates is preferred but ratios from about 25:75 to about 90:10 are usable in this invention. The alkyl ester mixture of the preferred embodiment is comprised of about 75 weight percent methyl para-toluate, 25 weight percent methyl benzoate. This mixture is commercially available under the designation "Methyl-P-Toluate/Benzoate"; for convenience such mixture will hereinafter be referred to as "MPTB".

Both MCB and MPTB have been recommended for use as dye assistants for the disperse dyeing of polyester fibers. When tested, in the dyeing system described in Example I, as assistants for both acid and disperse dyeing of certain specialty nylons comprised of 40% or greater of the condensation product of 4,4'-diamino dicyclohexyl methane and decanodicarboxylic acid having the basic repeating unit:

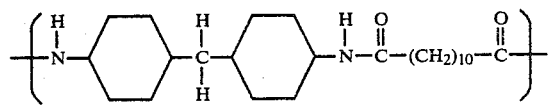

MCB, alone was found to be a moderately effective assistant for both acid and disperse dyes; MPTB, alone, was satisfactory with acid dyes but not an acceptable assistant with all the disperse dyes tested. Combinations of MCB with MPTB not only were satisfactory with the aforedescribed specialty nylon as dye assistants for acid dyes, but were also effective assistants for all the disperse dyes tested, particularly for the disperse dye Eastman Polyester Navy Blue 2R-LSW (Product of Eastman Chemical Products, Inc.), where, in contrast to the ineffective, or moderately effective, results produced by the individual components, the combinations were highly effective. The efficacy of the combinations as dye assistants for disperse dyes was substantially greater than that of the individual members of the combinations. The ratio of components in the combination may be from about 1:9 weight/weight to about 9:1 weight/weight MPTB/MCB, but preferably from about 7:3 weight/weight to about 3:7 weight/weight MPTB/MCB.

The assistants of the present invention are essentially insoluble in water and to be effective in the normally-used aqueous dye baths must be emulsified or otherwise dispersed in water. A convenient method of supplying these assistants for industrial use in as emulsifiable concentrates—a mixture of emulsifying agents and assistants which, when stirred with a minimum of energy into water, will give a usable emulsion. While the amount and type of emulsifying agent for specific dyes and fibers is determined by experience and experiment, a generally useful emulsifier system is one containing both anionic and non-ionic emulsifiers. Typical of anionic emulsifiers is the isopropylamine salt of dodecylbenzene sulfonic acid, of non-ionic emulsifiers is a polyoxyethylene derivative of caster oil.

Various amounts of the aforedescribed assistants can be used in order to accomplish the results of the present invention. The use of excess assistant while possible, is wasteful since after an efficient amount has been added, no additional beneficial results are achieved by an excess. The amount of assistant to be used, expressed as a weight ratio of assistant-to-dye should be between about 1:1 and 20:1, the precise amount depending on the fiber-dye-process conditions. (By "assistant" is meant the active components of a formulation, e.g. in Example I, the 80 weight percent emulsifiable concentrate contains 80% "assistant"). The amount of dye in the dye bath is commonly expressed as a weight percentage on-weight-of-fiber (OWF) and may be from about 0.1 to 10 with OWF percentages of from 1 to 5 being typical of commercial practice.

"Acid dyes" are in general salts of organic acids wherein the colorant portion of the dye is the anionic (negatively charged) moiety. The assistants of this invention are useful with fibers which can be dyed effectively with acid dyes, such fibers include the natural proteinaceous fibers such as wool and silk and the synthetic polyamide fibers such as the different types of nylons (e.g. nylon 66 or the aforedescribed specialty nylons).

"Disperse" dyes are called so because they are almost insoluble in water—which is the most commonly used dyeing medium—and are applied in the form of finely-divided particles which are dispersed in water. The dye assistants of this invention are useful also in the dyeing of fibers for which disperse dyes are used. Such fibers include modified regenerated natural products such as secondary cellulose acetate and cellulose triacetate, and totally synthetic fibers such as the polyesters (e.g.—the long chain condensation product of terephthalic acid and ethylene glycol) and the synthetic polyamides (e.g.—nylon 66 or the aforedescribed specialty nylon).

The actual procedures described below in Example I for the applying of dyes to fibers using the dye assistants of the present invention, are typical of those suggested for superatmospheric pressure dyeing of the aforedescribed specialty nylons which require relatively rigorous dyeing conditions. (See, for example, pp. 321–327, "Book of Papers, 1974 National Technical Conference" published in 1974 by the American Association of Textile Chemists and Colorists). Less rigorous conditions would be usable with nylons such as nylon 66 into which dyes diffuse more rapidly. With the appropriate modifications in processing, other methods of applying the dye—such as printing, padding, spraying onto the fiber, etc. are usable.

In addition to dyes and dye assistants, dyeing formulations usually contain various auxiliary agents. These agents can includes emulsifiers, anionic, cationic or non-ionic, for emulsifying or dispersing the dye and dye assistant in water. pH control may be accomplished by the addition of formic acid, acetic acid and the like. Sodium phosphate may be used for water softening, natural or artificial gums may be used to control the thickness of the formulation, surfactants may be used to improve wetting of the fabric, etc. The decision as to what and how much auxiliary to use and the sequency of addition usually rests with the dyemaster, his decisions being made on the basis of his experience of dyeing in general and of the fibers and dyes used in a particular dyeing operation. In Example I, a blend of the isopropylamine salt of dodecylbenzene sulfonic acid and a polyoxyethyated caster oil is used to emulsify the dye assistants, sodium hexametaphosphate is used for wetting purposes, mono-sodium phosphate is used as a buffer for pH control and sodium N-methyl-N-oleoyl taurate is a surfactant/emulsifier. This invention, however, is not limited to these particular auxiliaries nor the proportions used.

The compositions of the present invention contemplate dye preparations containing the aforedescribed combinations as essential dye assistants and either an acid or a disperse dye. The pH of these compositions may be any value commonly used for acid or disperse dyeing—typically from about 3 to slightly below 7; the dyebath of Example I has a pH of about 6.5. These compositions can have as optional components the aforementioned general type of auxiliary agents to control the physical and chemical conditions of the dyeing.

The specific additives to be used and their amounts depend upon the particular fiber to be dyed and on the operating conditions chosen.

The following Example I illustrates methods of preparing and applying the dye compositions of the present invention, which is not limited thereto.

The dyes used in the present invention and identified in Example I are representative of the classes of acid and disperse dyes and were chosen to give the three primary colors of red, blue and yellow since by suitable combination of these colors it is possible to obtain a wide variety of hues. Unless otherwise specified all temperature are in degrees Celsius, weights in grams and volumes in milliliters. Where "dye assistant" is specified, the reference is to the emulsifiable concentrate or aqueous dispersion; with the assistants of this invention, this concentrate contains 80 weight percent active components, 20 weight percent emulsifiers.

EXAMPLE I

PREPARATION OF A DISPERSE OR ACID DYEBATH COMPOSITIONS AND DYEING PROCEDURE

Experimental dye assistants were first formulated into emulsifiable concentrates by admixture at 30°–40° C. with emulsifiers to make a homogenous:

| Emulsifiable Concentrate | |
| --- | --- |
| Dye Assistant | 80 parts weight |
| Trydet 3300 | 15 |
| Trylox CO-40 | 5 |
| | 100 |

(Trydet 3300 is the isopropylamine salt of dodecylbenzene sulfonic acid, Trylox CO-40 is a polyoxyethylene derivative of castor oil. Both materials are products of Trylon Chemical Corporation, a division of Emery Industries, Inc.).

To an Atlas Electric Devices Company's Launder-Ometer, Model LHTP stainless steel test container were charged:

Approximately 300 ml tap water at about 50° C.
5 ml of 3% (wt) solution of sodium hexamethaphosphate
5 ml of 3% (wt) solution of monosodium phosphate
5 ml of 3% (wt) solution of sodium N-methyl-N-oleoyl taurate*
1 ml of an aforedescribed emulsifiable concentrate of dye assistant

* (Igepon T-51, a product of GAF Corporation)

(The tap water used in this example had a hardness of about 40 parts per million, but the invention is not limited to water of this hardness. The degree of hardness permissible depends upon the conditions peculiar to a particular dye formulation/fiber combination and a dyemaster will use water softeners to adjust hardness if he deems this necessary).

The above mixture was stirred until it became homogeneous. Then 0.2 gram (2 percent on-weight-of-fiber) of the dye to be used in the experiment was dissolved in about 84 ml of lukewarm tap water and this solution added to the above mixture. This final mixture was the completed dyebath and was, if necessary, adjusted to a volume of 400 ml by addition of tap water so as to give, with a 10 gram fiber sample, a bath-to-fiber ratio of 40:1. A 10 gram sample of the aforedescribed specialty nylon (type 470 or type 472, either giving substantially the same dyeing results, made by E. I. DuPont de Nemours & Company, Inc. and in the form of swatch of Qiana ® (DuPont's T.M.) fabric obtained from Testfabrics, Inc., their Style 324) was next added to the dyebath and the preparation stirred. The stainless steel container was then sealed pressure-tight and placed in the Launder-Ometer which was then switched "on" (at all times during the "on" condition, the dyebath was stirred by reason of its container being continually rotated in a manner which regularly inverted and righted it thus imparting a sloshing motion to the contained dyebath). The Launder-Ometer bath temperature was then rapidly (about 15 minutes) raised from room temperature (20°–25° C.) to 70° C. at which temperature the programmed heating mode of the Launder-Ometer was used to bring the bath temperature from 70° C. to 100° C. over a period of 45 minutes and from 100° C. to 130° C. over a period of 30 minutes. The bath was then held for one hour at 130° C. with the container contents under autogeneous pressure.

At the conclusion of this period, the programmed cooling mode of the Launder-Ometer was used to cool the bath to approximately 50° C. over a period of 50 to 60 minutes and the Launder-Ometer switched to "off".

After cooling, the container was removed from the Launder-Ometer, and emptied of its liquid contents. The degree of exhaustion of the dye was visually noted and observations made of loss of dyebath or of presence of glycerin in the container—both of which conditions were caused by faulty sealing of the container. No data were taken from runs showing such signs of leakage; the experiment was repeated until a satisfactory run was obtained.

The swatch was rinsed in lukewarm tap water and then washed by adding to its container 200 ml of solution, at 70° C., containing 1% of an alkyl aryl polyether surfactant (Triton X-100, product of Rohm & Haas Company) and 1% sodium pyrophosphate ($Na_4P_2O_7 \cdot 10 H_2O$) and soaking for 10 minutes. The swatch was then washed with lukewarm tap water until free of the surfactant/phosphate wash solution. After drying at room temperature from 16 to 24 hours, the swatch was heated in a forced draft over for about 3 minutes at 193° C. in order to free it of the last trace of dye assistant and to stabilize the dye. It was then ironed to help eliminate wrinkles and the effectiveness of the dye assistant evaluated. This effectiveness is a combination of a number of performance factors which a dyemaster would not normally measure quantitatively, but would subjectively evaluate and integrate to get an overall estimate of the merit of the assistant. These factors include: completeness of exhaustion of dye from the dyebath (the more complete, the better the assistant) trueness of hue and intensity or saturation of the color of the dyed fiber and evenness of dyeing—i.e. there are no darker or lighter areas on the dyed fiber. The above factors were evaluated for each dye and dye assistant combination tested in this experimental work. With acid dyes, the evaluation of color trueness and intensity was made using only the experimentally dyed fabric itself, with disperse dyes the colors of the dyed fabrics were judged against an array of samples of polyester fabric dyed with the same dyes and various assistants and covering the range of assistant effectiveness from highly effective to low effectiveness. While a dyemaster usually would classify an assistant as highly effective or moderately effective or of low effectiveness with no attempt to further quantitate his judgement, a numerical scale is adopted here to between differentiate differences between assistants. This scale is shown in Table I. A rating of 4 or higher is considered to indicate an assistant with commercial utility—with the proviso however that an off-hue color is not commercially acceptable even though consideration of other factors might lead to a rate of 4 or above.

The procedure detailed in Example I was used to prepare numerous dye compositions utilizing the following three acid and three disperse dyes:

| Experimental Designation | DYE DESCRIPTION |
|---|---|
| 1. | Capracyl Red B (C.I. Acid Red 182) |
| 2. | Supralan Yellow NR (C.I. Acid Yellow 121, C.I. No. 18690) |
| 3. | Alizarine Supra Blue A (C.I. Acid Blue 25, C.I. No. 62055) |
| 4. | Genacron Red B (C.I. disperse Red 88) |
| 5. | Eastman Polyester Yellow GLW (C.I. disperse Yellow 42, C.I. No. 10338) |
| 6. | Eastman Polyester Navy Blue 2R-LSW (C.I. disperse Blue 79) |

The following individual materials, and combinations were employed as dye assistants. Comparison of the results for the individual materials with those for the combinations illustrates the synergistic effects found and the particular effectiveness of the combinations with Eastman Polyester Navy Blue 2R-LSW (C. I. disperse Blue 79):

| Experimental Designations | Active Component of Assistant (Ratios by Weight) |
|---|---|
| A | Methyl Chlorobenzoates (MCB) |
| B | Methyl P-Toluate Benzoate (MPTB) |
| C | 7/3 MCB/MPTB |
| D | 3/7 MCB/MPTB |

TABLE I
EFFECTIVENESS RATINGS OF DYE ASSISTANTS

| DYE ASSISTANTS, EXPERIMENTAL DESIGNATIONS | DYES, EXPERIMENTAL DESIGNATIONS | | | | | |
|---|---|---|---|---|---|---|
| | ACID | | | DISPERSE | | |
| | 1 | 2 | 3 | 4 | 5 | 6 |
| A | 6 | 6 | 6 | 8 | 6 | 5 |
| B | 6 | 6 | 7 | 8 | 8 | 3(1) |
| C | 4–5 | 4–5 | 8–9 | 8 | 8 | 8 |
| D | 4–5 | 8–9 | 7 | 8 | 8 | 8 |

| Legend: | Numerical Rating | Effectiveness |
|---|---|---|
| | 1 | |
| | 2 | Low |
| | 3 | |
| | 4 | |
| | 5 | Medium |
| | 6 | |
| | 7 | |
| | 8 | High |
| | 9 | |

Note: (1) Off-Hue

The embodiments of the invention in which an exclusive property or privilege is claimed are defined as follows:

1. A dye composition for synthetic polyamide fibers comprised of forty percent or more of the condensation product of 4,4'-diamino-dicyclohexyl methane and decanodicarboxylic acid having the bias repeating unit:

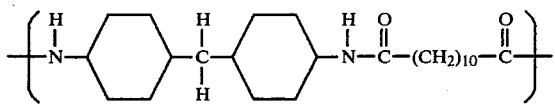

which comprises:
A. One part of weight C. I. Disperse Blue 79 dye and
B. From 1 to 20 parts by weight of a dye assistant comprised of a combination of:
  (a) from about 10 to about 90 weight percent of a mixture of lower alkyl esters of mono- and di-chlorinated benzoic acids; and
  (b) from about 90 to about 10 weight percent of a mixture of lower alkyl esters of toluic and benzoic acids.

2. The dye composition of claim 1 wherein mixture (a) comprises about 80 to 95 weight percent methyl esters of the isomers of di-chlorinated benzoic acid and about 20 to 5 weight percent of methyl esters of the isomers of mono-chlorinated benzoic acid.

3. The dye composition of claim 1 wherein mixture (b) comprises about 10 to 90 weight percent methyl esters of the isomers of toluic acid and about 90 to 10 weight percent methyl benzoate.

4. The dye composition of claim 1 wherein mixture (b) comprises about 10 to 90 weight percent methyl para-toluate and about 90 to 10 weight percent methyl benzoate.

5. In the process for the dyeing of synthetic polyamide fibers, comprised of forty percent or more of the condensation product of 4,4'-diamino-dicyclohexyl methane and decanodicarboxylic acid having the basic repeating unit:

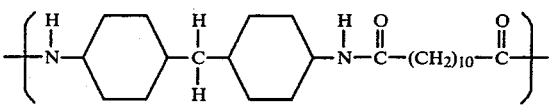

the improvement which comprises applying to the fiber an effective amount of the dye composition of claim 1.

* * * * *